United States Patent

Donges

[11] Patent Number: 5,987,395
[45] Date of Patent: Nov. 16, 1999

[54] PROCESS FOR MEASURING THE DISTANCE BETWEEN A MOTOR VEHICLE AND AN OBJECT

[75] Inventor: Edmund Donges, Fuerstenfeldbruck, Germany

[73] Assignee: Bayerische Motoren Werke Aktiengesellschaft, Munich, Germany

[21] Appl. No.: 08/877,473

[22] Filed: Jun. 17, 1997

[30] Foreign Application Priority Data

Jun. 17, 1996 [DE] Germany ............ 196 24 043

[51] Int. Cl.[6] ............ G01S 9/42
[52] U.S. Cl. ............ 702/158; 702/149; 702/159
[58] Field of Search .................. 342/118, 194, 342/189, 175, 195; 702/85, 94, 97, 142–144, 149, 155, 158, 159, 189–194, 199

[56] References Cited

U.S. PATENT DOCUMENTS

| 3,750,169 | 7/1973 | Strenglein . | |
|---|---|---|---|
| 4,026,654 | 5/1977 | Beaurain . | |
| 4,117,538 | 9/1978 | Shrader et al. | 342/91 |
| 4,618,863 | 10/1986 | Collins . | |
| 5,191,337 | 3/1993 | Brouko et al. | 342/200 |
| 5,216,611 | 6/1993 | McElreath | 701/221 |
| 5,247,306 | 9/1993 | Hardange et al. . | |
| 5,359,331 | 10/1994 | Adler . | |
| 5,467,072 | 11/1995 | Michael . | |
| 5,495,252 | 2/1996 | Adler . | |
| 5,694,130 | 12/1997 | Suzuki et al. | 342/7 |
| 5,731,784 | 3/1998 | Barrow et al. | 342/204 |

FOREIGN PATENT DOCUMENTS

| 0 718 637 | 6/1996 | European Pat. Off. . |
|---|---|---|
| 36 35 396 | 4/1988 | Germany . |

*Primary Examiner*—John Barlow
*Assistant Examiner*—Craig Steven Miller
*Attorney, Agent, or Firm*—Evenson, McKeown, Edwards & Lenahan, PLLC

[57] ABSTRACT

In the case of a process for measuring the distance between a motor vehicle and an object, in the vehicle, in the case of a short distance of the object, the output signals of a first measuring device with a corresponding measuring range and, in the case of a longer distance of the object, the output signals of a second measuring device with a correspondingly longer measuring range are taken into account in a dominating manner. The measuring devices are constructed as analysis devices. The output signal of a single receiver for a single distance generator is supplied to the analysis devices as an input signal. The analysis devices analyze this input signal via an analysis process which is characteristic of the shorter or the longer distance range.

13 Claims, 2 Drawing Sheets

PROCESS FOR MEASURING THE DISTANCE BETWEEN A MOTOR VEHICLE AND AN OBJECT

BACKGROUND AND SUMMARY OF THE INVENTION

This application claims the priority of German Application No. 196 24 043.3, the disclosure of which is expressly incorporated by reference herein.

The invention relates to a measuring process as known from U.S. Pat. No. 4,026,654. In the case of the known process, two measuring devices are provided which are completely independent of one another and may operate, for example, on a different basis. Thus, the measuring device for a short distance range may operate on an ultrasound basis and the measuring device for a longer distance range may operate on a radar or laser basis.

There is therefore needed a simplified measuring process of the above-mentioned type to the extent that the measuring equipment required for this purpose is simplified.

These needs are met according to the present invention by process for measuring the distance between a motor vehicle and an object, in which, in the vehicle, in the case of a short distance to the object, the output signals of a first measuring device with a corresponding measuring range and, in the case of a longer distance to the object, the output signals of a second measuring device with a corresponding larger measuring range are taken into account in a dominating manner. The measuring devices are constructed as analysis devices. The output signal of a single receiver for a single distance generator is fed to the analysis devices as an input signal. The analysis devices analyze this input signal via an analysis process characteristic of the short distance range or of the long distance range.

According to the present invention, only a single sensor is required which scans the whole distance range. The sensor can operate on a laser or radar basis. The use of ultrasound should, as a rule, be eliminated when a distance range is involved which on the whole is relatively long and measures more than ten meters.

The sensor emits a test signal, preferably a periodically repeated frequency-modulated continuous wave radar signal (FMCW). The signals reflected by an object are received by a single receiver and fed to the two analysis devices. There, the input signal is treated by means of analyzing processes which are characteristic of the respective distance range.

The output signal of the two analysis devices is weighted differently corresponding to the respective distance of the measuring range.

The analysis processes for the respective measuring ranges can have different designs. Having a particularly good resolution precision, a correlation process is suitable for the short distance range. In this case, the reflected signal is correlated with a reference signal; for example, is subjected to an auto correlation and the distance of the respective object is determined in this manner. Alternatively, the analysis process can be a spectral analysis process according to a Fast Fourier Transform (FFT) process using a signal delay line.

For the longer distance range, different measuring processes are also known. In tests, the use of a spectral analysis was found to be particularly advantageous. In this case, a radar signal is modulated in the transmission frequency in a suitable manner, for example, in a saw tooth shape or a triangular shape and, from the frequency shift, the distance is determined by means of a spectral analysis. It is also possible to determine the distance by the transit time of a radar pulse which is frequency-modulated during its emission.

Other objects, advantages and novel features of the present invention will become apparent from the following detailed description of the invention when considered in conjunction with the accompanying drawings.

DETAILED DESCRIPTION OF THE DRAWINGS

Figure 1:
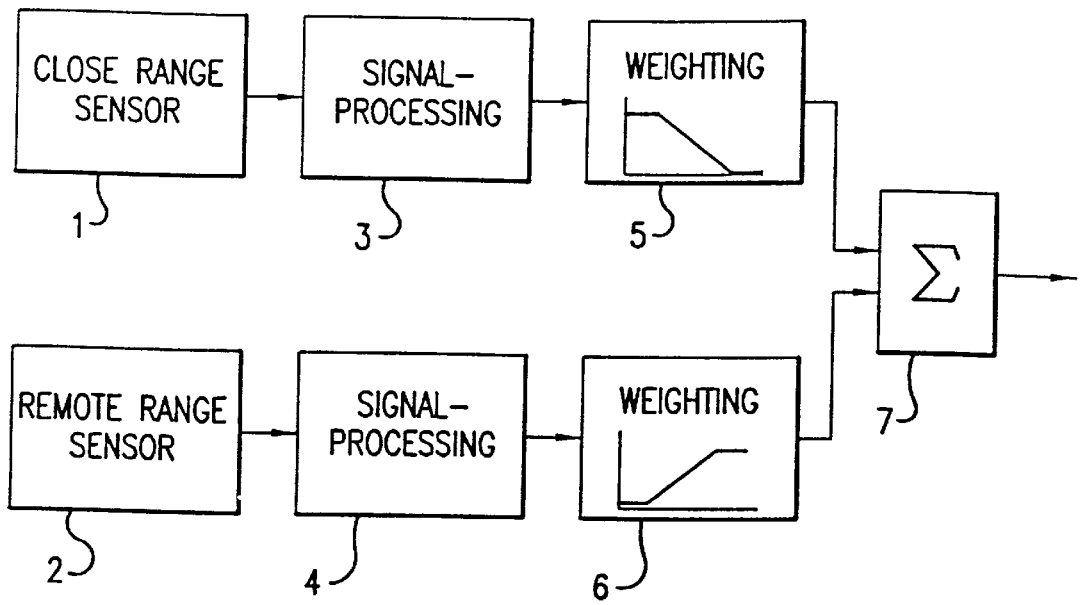
FIG. 1 is a block diagram illustrating a measuring process using two sensors for close and remote ranges.

In the process illustrated in FIG. 1, two mutually independent sensors 1 and 2 are used for determining the close range and the distance (remote) range, respectively. Output signals from the respective sensors 1, 2 are provided to signal processing devices 3, 4, respectively. Corresponding weighting devices 5, 6 are arranged downstream of the signal processing devices 3, 4. Output signals from the weighting devices 5, 6 are provided to a summation element 7 such that information is therefore obtained concerning the distance of an object in front of, or in the case of a corresponding alignment of two sensors, of an object behind or located laterally of the motor vehicle.

Figure 2:
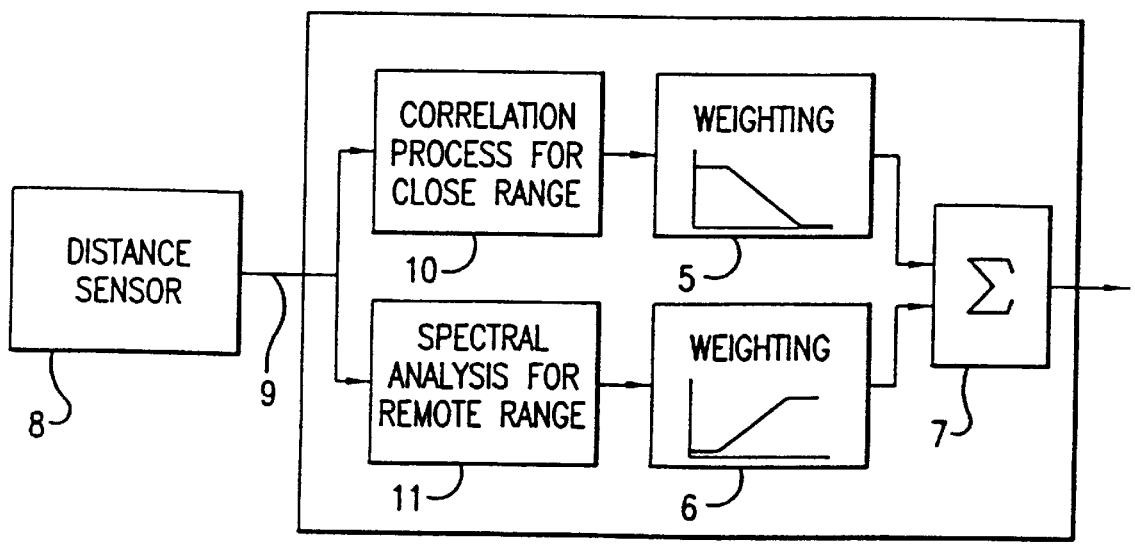
FIG. 2 is a block diagram illustrating the process according to the invention using one sensor and specific analysis methods for close and remote ranges.

In the process according to the invention illustrated in FIG. 2, a single distance sensor 8 is provided which scans the entire area to be investigated which consists of both the close range and the remote range. This sensor 8 may be a radar transmitter which sends a radar signal into the investigated area at regularly timed intervals. The signal is reflected by an object, or by several objects, present in the investigated area and is received in a receiver (which is not shown but which may, for example, form a constructional unit together with the transmitter). By way of a single line 9, this input signal is supplied to two analysis devices 10 and 11. The analysis device 10 will furnish information if the obstacle is in the close range (from 0 to 5 m). The analysis device 11 will furnish information if the object is in the remote range (from 5 to 100 m). As in the process of FIG. 1, the weighting devices 5 and 6 are connected behind the respective analysis devices 10 and 11. The output signals from the weighting devices are in turn supplied to the summation element 7.

The analysis device 10 for the close range operates, for example, via a correlation process, or as an alternative, via a spectral analysis according to a Fast Fourier Transform (FFT) process using a signal delay line.

The analysis device 11 for the remote range carries out a spectral analysis. As an alternative, it is also possible to carry out measurements of the transit time of a radar pulse.

The different methods of operation of the two analysis devices 10, 11 will be explained using the example of an FMCW (Frequency Modulated Continuous Wave) radar measuring process for measuring the distance of static obstacles.

Example of an Analysis Process for the Long Distance Range

Figure 3:
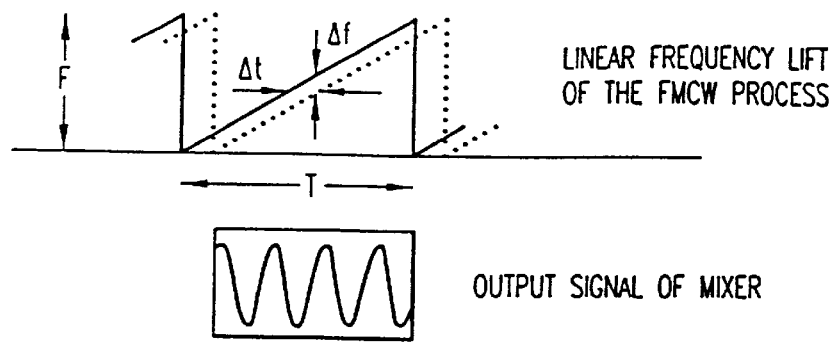
FIG. 3 is a diagram of saw tooth-shaped frequency modulation of an FMCW radar distance measuring process.

Long distances (in the case of an automobile, the radar sensor ranges measure, for example, up to 150 m) are analyzed according to a classic FMCW process. This is characterized in that a carrier frequency of, for example, 76 GHz is modulated in a linear manner by way of a saw-tooth-shaped frequency modulation with a frequency lift of, for example, F=150 MHz within the saw tooth period T of, for example, 1 ms (FIG. 3). Under the condition of a linear frequency rise over time, the distance r of a static object can be determined from the frequency shift between the emitted signal and the signal reflected by the object according to the following fundamental equations:

$$\Delta t = 2r/c \qquad \text{(Equation 1)}$$

The time lag $\Delta t$ between the emitted radiation and the radiation reflected by a static object at the distance r amounts to twice the transit time (back and forth). The transit time is obtained as the quotient of the distance r and the speed of light c.

$$\Delta f/\Delta t = F/T \qquad \text{(Equation 2)}$$

Equation 2 can easily be derived from FIG. 3. From Equations 1 and 2, the frequency shift in the case of an object distance r is obtained with:

$$\Delta f = 2F\, r/(T\, c) \qquad \text{(Equation 3)}$$

In the case of the indicated numerical example F=150 MHz, T=1 ms, c=$3 \cdot 10^8$ m/s, a distance r=1 m therefore supplies a frequency shift of 1 kHz.

In the electronic analysis system of the FMCW radar, a mixer circuit supplies, as the distance information, an oscillation with the frequency shift $\Delta f$ pertaining to the respective distance; thus, in the numerical example 100 kHz in the case of r=100 m, or 1 kHz in the case of r=1 m.

This oscillation is digitized by a sufficiently fast analog to digital converter with a scanning rate of, for example, 1 MHz. By means of an FFT (Fast Fourier Transformation), the digitized oscillation is analyzed in each case for the period duration T of the saw-tooth modulation with respect to its spectral power density. The result of the FFT is a discrete power density spectrum whose discrete spectral lines have a frequency spacing of 1/T. This discrete frequency spacing at the same time corresponds to the distance resolution, in the numerical example 1 m.

For longer distances, as, for example, when following in flowing traffic, this distance resolution is sufficient. However, in stop and go traffic or during parking maneuvers, resolutions and distances in the 10 cm-range are required. Therefore, another analysis process is required for the close range (less than 3 to 5 m).

Example of an Analysis Process for the Close Range

Figure 4:
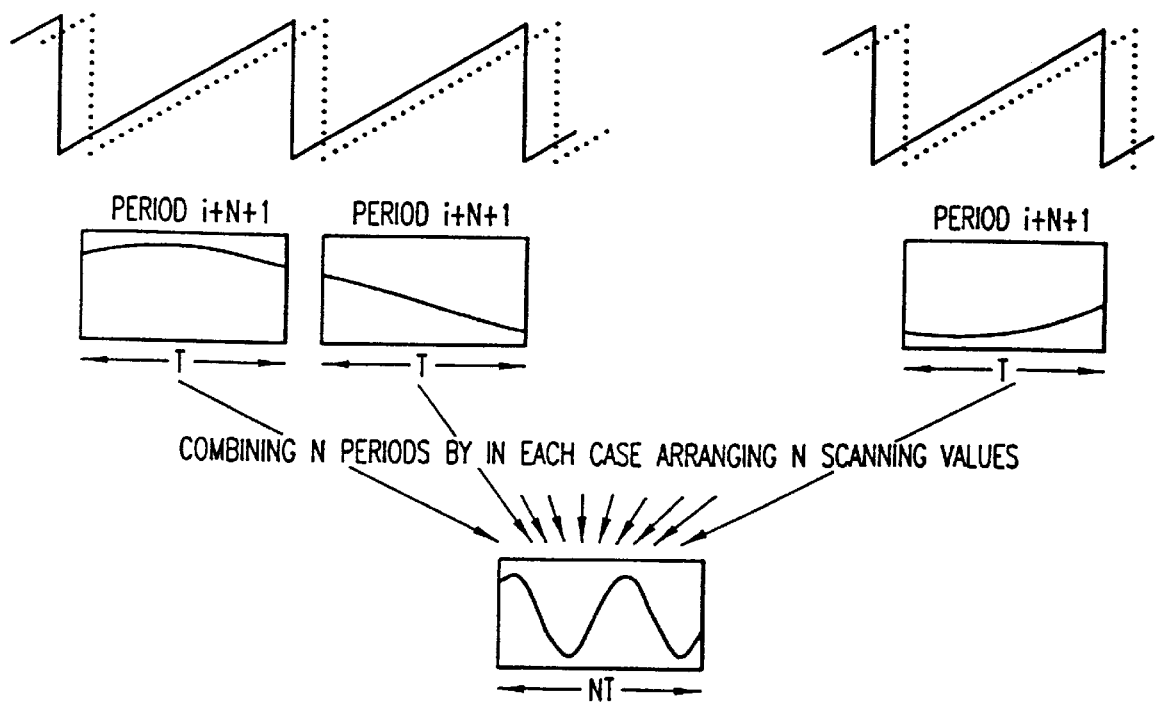
FIG. 4 is a diagram illustrating the combination of mixed output signals during several modulation periods to form a replacement signal.

If the shortest measurable distance and the distance resolution are to be reduced by a factor of N, the measuring values of the analog-to-digital converter, instead of being collected over a period T, can be collected over N periods and can then be analyzed by way of an FFT (FIG. 4). In order not to let the number of supporting points from the time line for the FFT become larger than in the case of the remote range process, in each case N measuring values can be combined by means of their average value and replaced, thus limiting the computing expenditures for the FFT. This averaging process also helps to reduce signal interferences which always exist in practice.

In order to be able to emit these close range measuring values at the same timing rate as those of the remote range, it is practical to operate the time line formed over in each case N periods in the form of a shift register in that the measuring values from the oldest period are canceled and the others are in each case shifted by one period and the measuring values from the youngest period are added.

It is therefore possible to scan the entire area to be by investigated using only a single transmitter and receiver and, independently of the distance of the object, it is possible to obtain exact information concerning the object's distance from the vehicle.

What is claimed is:

1. A process for measuring a distance between a motor vehicle and an object, the process comprising the steps of:

factoring into account in a dominating manner output signals from a first measuring device having a corresponding first measuring range for short distances to the object and a second measuring device having a corresponding second larger measuring range for longer distances to the object, wherein said first and second measuring devices are analysis devices; and feeding a single sensor output signal of a single receiver for a single distance generator to said analysis devices as an input signal; and analyzing said input signal via analysis processes in said analysis devices, one of said analysis devices using an analysis process characteristic of a short distance range and the other analysis device using an analysis process characteristic of a long distance range.

2. The measuring process according to claim 1, wherein said analysis process for the short distance range is a correlation process.

3. The measuring process according to claim 2, wherein the analysis process for the long distance range is a spectral analysis process.

4. The measuring process according to claim 1, wherein the analysis process for the long distance range is a spectral analysis process.

5. The measuring process according to claim 1, wherein said analysis process for the short distance range is a fast fourier transformation process.

6. A process for measuring a distance between a vehicle and an object, the process comprising the steps of:

operating a single distance sensor to scan an entire investigated area including a close and a remote range to provide a single input signal;

supplying said single input signal to two analysis devices; and analyzing said single input signal in a first of said two analysis devices using an analysis process characteristic of a short distance range and, in a second of said two analysis devices using a different analysis process characteristic of a long distance range.

7. The measuring process according to claim 6, wherein said first analysis process is a correlation process.

8. The measuring process according to claim 7, wherein said second analysis process is a spectral analysis.

9. The measuring process according to claim 6, wherein said second analysis process is a spectral analysis.

10. The measuring process according to claim 6, wherein said first analysis process is a fast fourier transformation process.

11. An apparatus for determining a distance between a vehicle and an object, comprising:

a single distance sensor which scans an entire area to be investigated and provides a single distance signal output;

a processor which receives said single distance signal output as an input signal, said processor being programmed to perform different analysis processes for different measuring ranges to determine a distance to said object.

12. The apparatus according to claim 11, wherein said different analysis processes comprise:

a correlation process device which receives the input signal for a short distance range; and a spectral analysis device which receives the input signal for a long distance range.

13. The apparatus according to claim 11, wherein said different analysis processes comprise:

a fast fourier transformation process device which receives the input signal for a short distance range; and a spectral analysis device which receives the input signal for a long distance range.

* * * * *